United States Patent
Nakada et al.

(10) Patent No.: US 10,343,282 B2
(45) Date of Patent: Jul. 9, 2019

(54) METHOD FOR CAUSING ROBOT TO FIT MALE COMPONENT IN FEMALE COMPONENT

(71) Applicant: FANUC CORPORATION, Yamanashi (JP)

(72) Inventors: Youhei Nakada, Yamanashi (JP); Yoshinori Ochiishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 276 days.

(21) Appl. No.: 15/341,433

(22) Filed: Nov. 2, 2016

(65) Prior Publication Data

US 2017/0129104 A1    May 11, 2017

(30) Foreign Application Priority Data

Nov. 9, 2015    (JP) .................... 2015-219659

(51) Int. Cl.
*B25J 9/16*    (2006.01)

(52) U.S. Cl.
CPC ........... *B25J 9/1687* (2013.01); *B25J 9/1697* (2013.01); *G05B 2219/40031* (2013.01); *G05B 2219/40087* (2013.01)

(58) Field of Classification Search
CPC .................. B25J 9/1687; B25J 9/1697; G05B 2219/40031; G05B 2219/40087
See application file for complete search history.

(56) References Cited

U.S. PATENT DOCUMENTS

| | | | |
|---|---|---|---|
| 6,141,863 A | 11/2000 | Hera et al. | |
| 8,725,589 B1 * | 5/2014 | Skelding | G06Q 20/341 705/26.5 |
| 9,032,603 B2 * | 5/2015 | Yamamoto | B23P 19/105 29/407.1 |
| 9,849,592 B2 * | 12/2017 | Takahashi | B25J 9/1694 |

FOREIGN PATENT DOCUMENTS

| | | |
|---|---|---|
| JP | 63062622 A | 3/1988 |
| JP | H01121193 A | 5/1989 |
| JP | 2004-249378 A | 9/2004 |
| JP | 2012139776 A | 7/2012 |
| JP | 2013154446 A | 8/2013 |
| WO | 9817444 A1 | 4/1998 |

* cited by examiner

*Primary Examiner* — John C Hong
(74) *Attorney, Agent, or Firm* — RatnerPrestia

(57) ABSTRACT

A method able to easily fit a movable shaft part in the corresponding hole. The method includes grasping the base part by the robot and arranging the base part at vertically upward of the top face of the female component so that the plurality of shaft parts are suspended from the base part, moving the base part downward by the robot, and, if a tip end (106c) of at least one shaft part is not inserted into the hole so as to butt against the top face of the female component when moving the base part vertically downward by the robot, moving each of portions of the base part, from which the shaft parts are suspended, in a horizontal direction.

5 Claims, 15 Drawing Sheets

METHOD FOR CAUSING ROBOT TO FIT MALE COMPONENT IN FEMALE COMPONENT

BACKGROUND OF THE INVENTION

1. Field of the Invention

The invention relates to a method for causing a robot to fit a male component into a female component.

2. Description of the Related Art

Methods for causing a robot to fit a male component having a plurality of shaft parts into a female component having a plurality of holes capable of receiving the shaft parts, have been known (e.g., Japanese Unexamined Patent Publication (Kokai) No. 2004-249378).

In some male components, shaft parts are movably retained and it has been difficult to fit such movable shaft parts into the corresponding holes.

SUMMARY OF THE INVENTION

The invention relates to a method of fitting a male component to a female component by a robot. The male component includes a base part and a plurality of shaft parts attached to the base part. The shaft parts are movable in an axial direction thereof with respect to the base part, and are hooked at predetermined positions so as to be not able to move in one direction of the axial direction. The female component includes a top face and a plurality of holes formed so as to be recessed from the top face and arranged to be able to receive the plurality of shaft parts respectively.

The method comprises grasping the base part by the robot and arranging the base part at vertically upward of the top face of the female component so that the plurality of shaft parts are suspended at vertically downside from the base part in a state where the plurality of shaft parts are hooked at the predetermined positions so as to be not able to move in the axial direction toward vertically downward, and moving the base part vertically downward by the robot so that a bottom face of the base part approaches the top face of the female component.

The method comprises, if a tip end of at least one shaft part is not inserted into the hole so as to butt against the top face of the female component when moving the base part vertically downward by the robot, moving each of portions of the base part, from which the shaft parts are suspended, in a horizontal direction so that the tip end of the at least one shaft part slides on the top face of the female component along a pathway which passes the hole.

Each of the portions may be reciprocated in the horizontal direction by the robot when moving each of the portions in the horizontal direction. The base part may be moved vertically downward by the robot, concurrently with moving each of the portions in the horizontal direction.

The base part may include a plurality of through-holes. The shaft part may include a main body inserted into the through-hole so as to be able to slide in the axial direction, and a flange projecting out from the main body, and engaging the top face of the base part so as to hook the shaft part on the base part at the predetermined position. The method may further comprises detecting that at least one shaft part is displaced vertically upward with respect to the base part when moving the base part vertically downward.

The method may further comprises moving the base part vertically upward by the robot so that the tip ends of the plurality of shaft parts are separated vertically upward from the top face of the female component, when detecting that the at least one shaft part is displaced vertically upward.

The method may further comprises moving the base part vertically downward by the robot so that the bottom face of the base part approaches the top face of the female component, after moving the base part vertically upward.

The method may further comprises, if a tip end of at least one shaft part is not inserted into the hole so as to butt against the top face of the female component when the base part is moved vertically downward by the robot after moving the base part vertically upward, moving each of the portions in the horizontal direction so that the tip end of the at least one shaft part slides on the top face of the female component along a pathway which passes the hole.

The method may further comprises imaging the top face of the female component, and determining a position and posture of the base part when arranging the base part at vertically upward of the top face, based on the image of the top face.

BRIEF DESCRIPTION OF THE DRAWINGS

The above-mentioned and other objects, features, and advantages of the invention will be clarified from the detailed description of embodiments with reference to accompanying drawings, in which.

DETAILED DESCRIPTION

Figure 1:
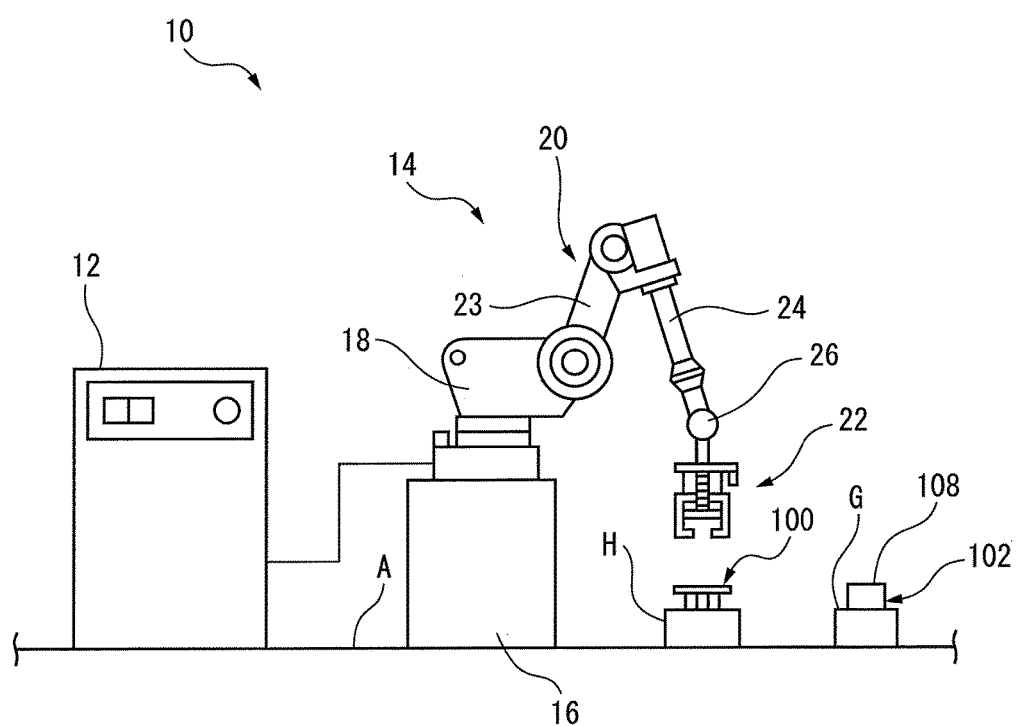
FIG. 1 is a view of a robot system according to an embodiment of the invention.

Embodiments of the invention will be described below in detail with reference to the drawings. First, with reference to FIGS. 1 to 3, a robot system 10 according to an embodiment of the invention will be described. Note that, an upper direction (upward) in the following description indicates an upper direction in the vertical direction (vertically upward), and corresponds to the upper direction in FIGS. 1 and 2.

The robot system 10 is for grasping and moving a male component 100, and then fitting it into a female component 102. The robot system 10 includes a controller 12 and a robot 14.

The controller 12 includes e.g. a central processing unit (CPU) and a memory (both are not shown), and directly or indirectly controls each component of the robot 14.

The robot 14 is e.g. a vertical articulated robot, and includes a robot base 16, a revolving drum 18, a robot arm 20, and a robot hand 22. The robot base 16 is fixed on a floor of a work cell A. The revolving drum 18 is attached to the robot base 16 so as to be rotatable about a vertical axis.

The robot arm 20 includes an upper arm 23 rotatably attached to the revolving drum 18, and a forearm 24 rotatably attached to a distal end of the upper arm 23. A wrist 26 is provided at a front end of the forearm 24. The robot hand 22 is attached to the front end of the forearm 24 via the wrist 26.

Figure 3:
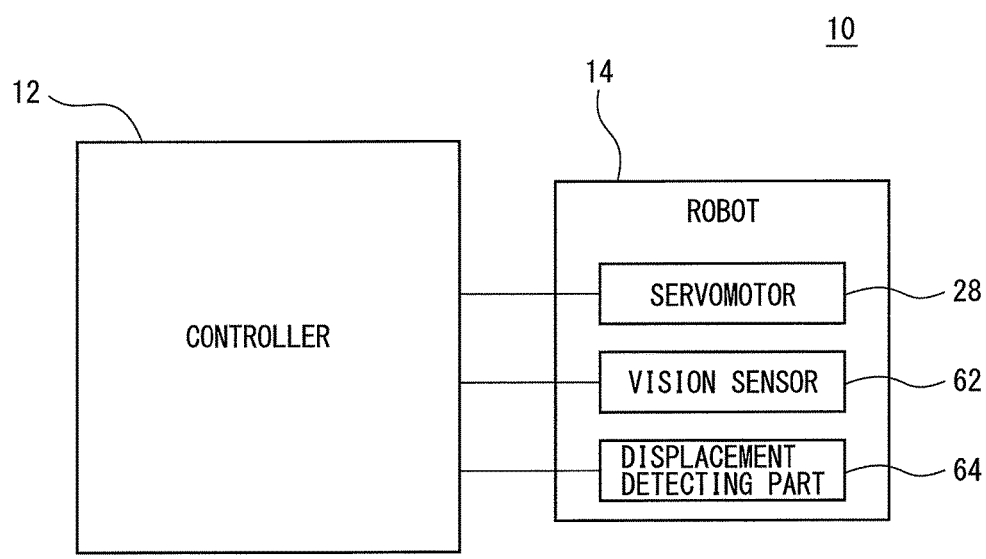
FIG. 3 is a block diagram of the robot system shown in FIG. 1.

The robot 14 includes a plurality of servomotors 28 (FIG. 3). The servomotors 28 are built in the revolving drum 18, the robot arm 20, and the robot hand 22, so as to drive rotation axes of these movable elements to rotate. The controller 12 transmits commands to the servomotors 28 so as to operate the movable elements of the robot 14.

Figure 2:
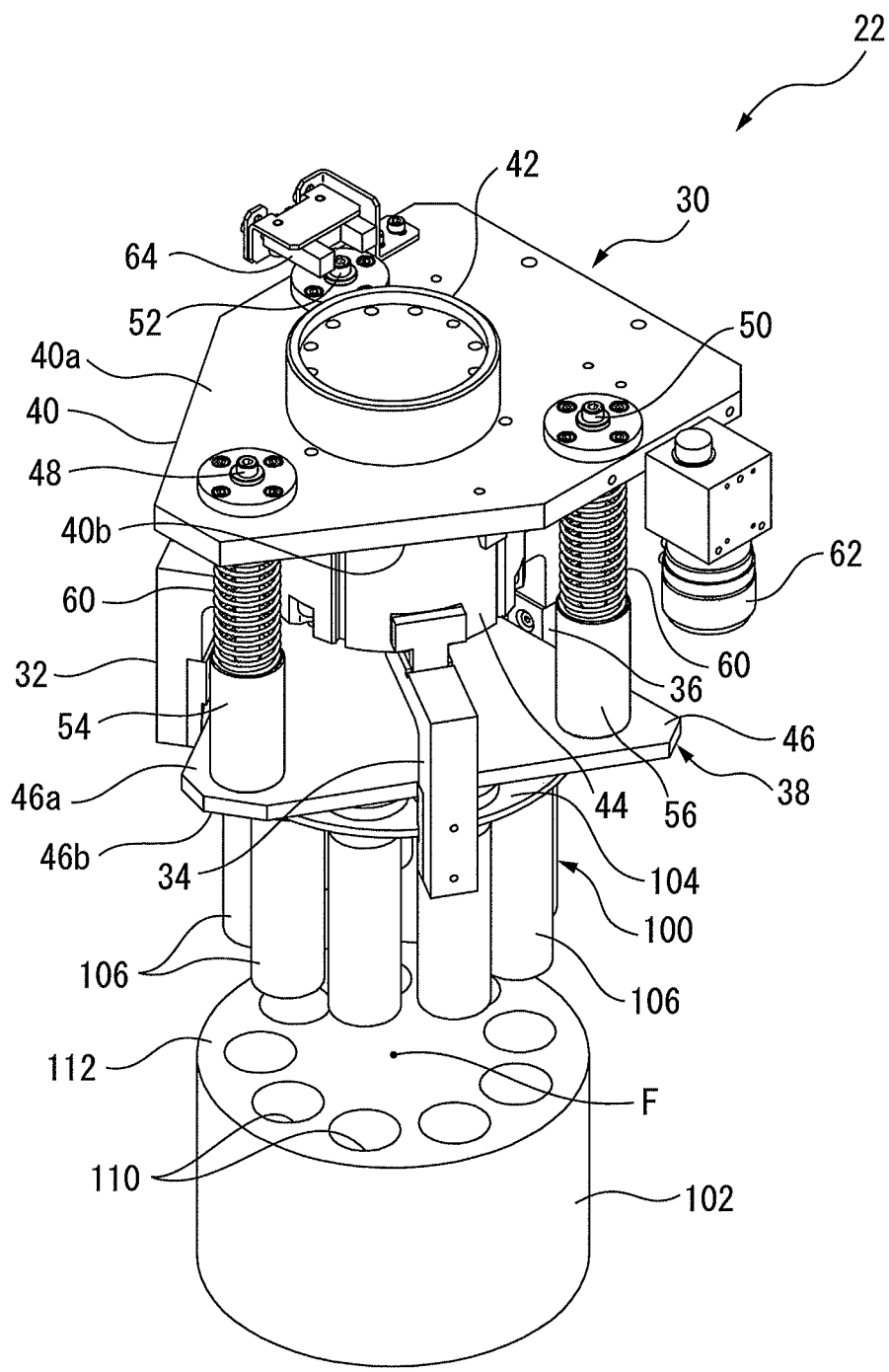
FIG. 2 is an enlarged view of the robot hand shown in FIG. 1.

As shown in FIG. 2, the robot hand 22 includes a hand base 30, a plurality of fingers 32, 34 and 36, and a movable receiving part 38. The hand base 30 is connected to the wrist 26.

Specifically, the hand base 30 includes a base plate 40, a connection rod 42 extending upward from a top face 40a of the base plate 40, and a columnar finger retaining part 44 secured to a bottom face 40b of the base plate 40. The connection rod 42 is connected to the wrist 26.

The fingers 32, 34, and 36 are attached to the finger retaining part 44 so as to be able to open and close. In this embodiment, a total of three fingers 32, 34 and 36 are provided so as to align in the circumferential direction of the finger retaining part 44 at equal intervals of approximately 120°.

The fingers 32, 34 and 36 are moved so as to approach and separate away from each other by an air chuck (not shown). With these fingers 32, 34 and 36, the hand base 30 can grasp and release the male component 100.

The movable receiving part 38 includes a receiving plate 46 and a plurality of shafts 48, 50 and 52. The receiving plate 46 has a substantially triangular shape, and is arranged to be separate downward from the finger retaining part 44.

The fingers 32, 34 and 36 are respectively arranged at positions corresponding to sides of the triangular receiving plate 46, and extend downward of the receiving plate 46 so as to be able to grasp the male component 100 beneath the receiving plate 46.

On a top face 46a of the receiving plate 46, a total of three bosses 54, 56 and 58 (FIG. 6) are provided so as to extend upward from the top face 46a. Each of the bosses 54, 56 and 58 is a columnar member having a diameter greater than the shafts 48, 50 and 52.

The shafts 48, 50 and 52 respectively extend upward from the bosses 54, 56 and 58. Each of the shafts 48, 50 and 52 is arranged at a vicinity of corresponding vertex of the triangular receiving plate 46.

A total of three through-holes (not shown) are formed in the base plate 40 at positions corresponding to the positions of the shafts 48, 50 and 52. Into these through-holes, the shafts 48, 50, and 52 are respectively inserted so as to be slidable in the vertical direction, so that the top ends of the shafts 48, 50 and 52 project upward from the top face 40a of the base plate 40.

A total of three coil springs 60 are interposed between the base plate 40 and the bosses 54, 56 and 58. Each coil spring 60 is arranged to surround the corresponding one of the shafts 48, 50, and 52, and biases the base plate 40 and the receiving plate so as to move away from each other.

The robot 14 further includes a vision sensor 62 and a displacement detecting part 64. The vision sensor 62 is secured to the base plate 40. The vision sensor 62 is e.g. a three-dimensional vision sensor, and images the female component 102 in accordance with a command from the controller 12.

The displacement detecting part 64 includes e.g. a proximity switch or a displacement gauge, and is attached to the base plate 40. The displacement detecting part 64 can detect that the shafts 48, 50, and 52 projecting from the top face 40a of the base plate 40 are displaced upward with respect to the base plate 40.

Next, the male component 100 will be described with reference to FIG. 4. The male component 100 includes a disk-shaped base part 104 and a plurality of shaft parts 106. A plurality of circular through-holes 108 are formed at the base part 104.

The through-holes 108 are arranged so as to align in the circumferential direction of the base part 104 at substantially equal intervals. More specifically, the centers of the through-holes 108 are arranged on a circle having a diameter E and being coaxial with the base part 104, so as to align at substantially equal intervals.

Each shaft part 106 includes a main body 106a and a flange 106b projecting out from the main body 106a. The main body 106a is a columnar member having a diameter smaller than the through-holes 108, and is inserted into the corresponding through-hole 108 so as to be slidable in an axial direction B of the main body 106a.

The flange 106b is a disk-shaped member provided so as to extend radially outward from the top end of the main body 106a, and has a diameter greater than the through-holes 108. In this embodiment, the base part 104 is formed with a total of nine through-holes 108, into which a total of nine shaft parts 106 are respectively inserted.

Figure 4:
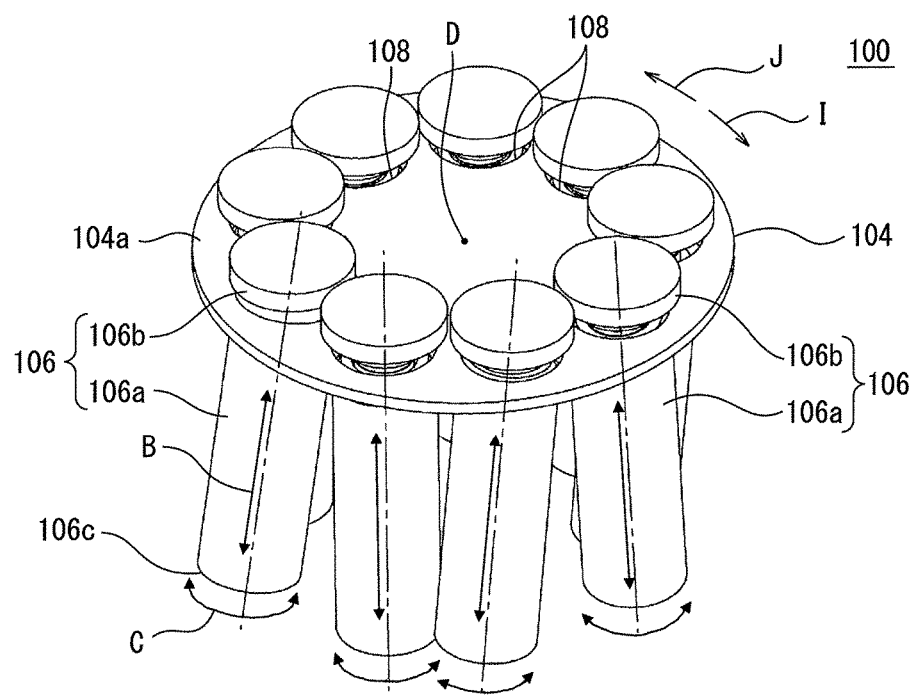
FIG. 4 is a view of the male component shown in FIG. 1.

As shown in FIG. 4, if the base part 104 is lifted up in a state where the shaft parts 106 are inserted into the through-holes 108, the flanges 106b engage a top face 104a of the base part 104, thereby the shaft parts 106 is hooked so as be not able to move axially downward (i.e., the movement of the shaft parts 106 to axially downward is blocked). Thus, the shaft parts 106 are hooked on the base part 104 at positions at which the flanges 106b are formed (i.e., predetermined positions).

The shaft parts 106 can slide through the corresponding through-holes 108 in the axial direction B, and can rotate in a direction indicated by an arrow C. Thus, the tip ends 106c of the shaft parts 106 are free ends which are able to swing.

The robot hand 22 can grasp the base part 104 of the male component 100 by the fingers 32, 34, and 36.

Next, the female component 102 will be described with reference to FIG. 2. The female component 102 is a columnar member, and includes a top face 112 and a plurality of holes 110 formed so as to be recessed downward from the top face 112. In this embodiment, the top face 112 is a flat surface, and is substantially horizontally arranged when the robot 14 carries out fitting the male component 100 to the female component 102.

In this embodiment, a total of nine holes 110 are formed at the female component 102. The holes 110 have diameters greater than those of the main bodies 106a of the shaft parts 106, and can receive the main bodies 106a, respectively.

The centers of these holes 110 are arranged on a circle having the diameter E and being coaxial with the female component 102, so as to align at substantially equal intervals. These holes 110 are arranged at positions corresponding to the positions of the through-holes 108 formed at the base part 104 of the male component 100.

The vision sensor 62 images the top face 112 of the female component 102, and calculates from the image of the top face 112 coordinates of the center F of the top face 112 and coordinates of the holes 110. The vision sensor 62 transmits data of the calculated coordinates to the controller 12.

Figure 5:
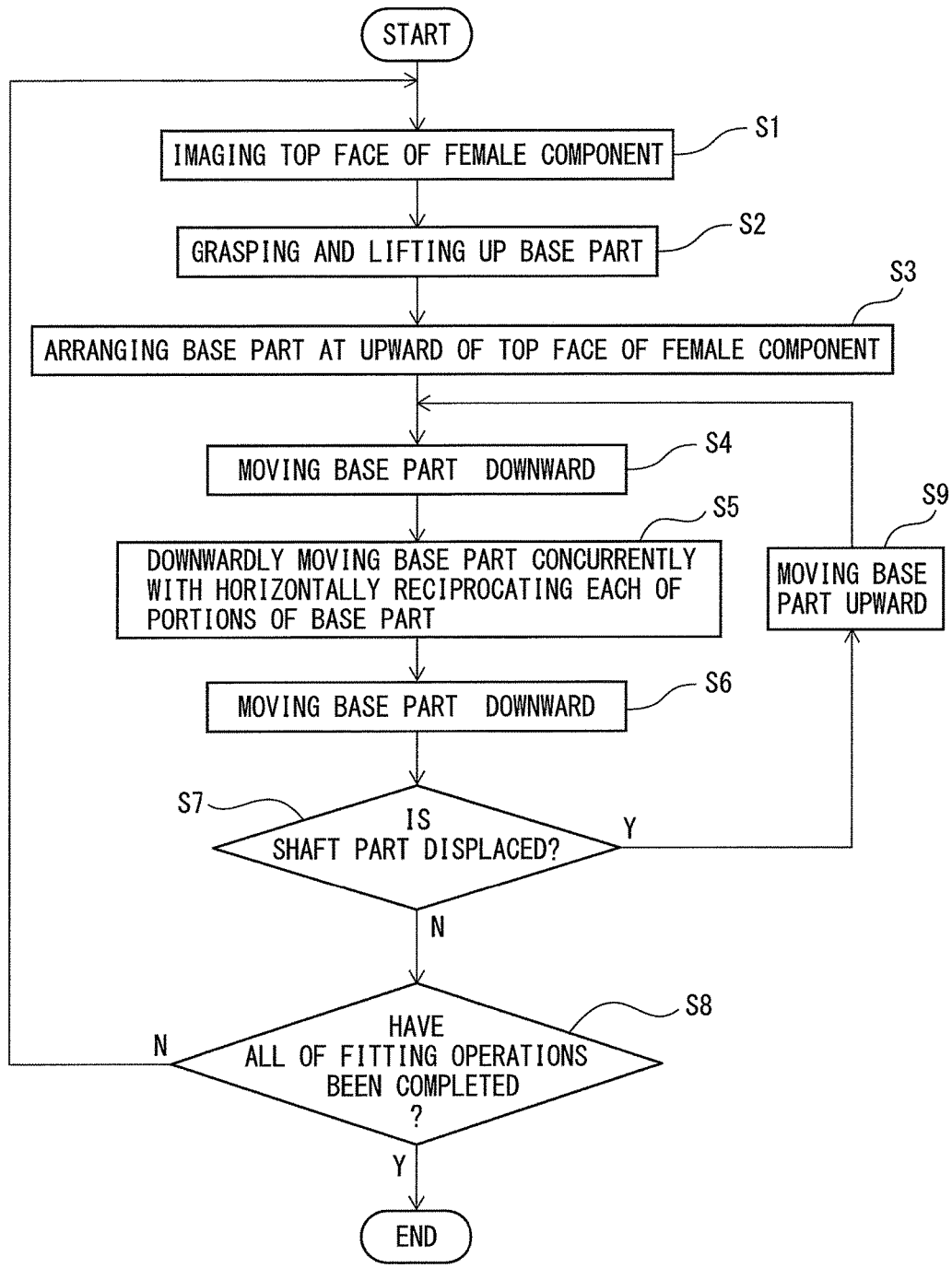
FIG. 5 is a flowchart of an example of a method of fitting the male component to the female component by the robot shown in FIG. 1.

Next, a method of fitting the male component 100 into the female component 102 by the robot 14 will be described with reference to FIG. 5. The operation flow shown in FIG. 5 is started when the controller 12 receives from a user, host controller or program, an operation command for carrying out fitting the male component 100 into the female component 102.

At step S1, the controller 12 images the top face 112 of the female component 102 by the vision sensor 62. Specifically, the controller 12 operates the robot 14 so as to arrange the vision sensor 62 at upward of the female component 102 placed at a predetermined location G (FIG. 1).

At this time, the vision sensor 62 is arranged at a position where it can image the top face 112 of the female component 102. Then, the controller 12 transmits an imaging command to the vision sensor 62. The vision sensor 62 images the top face 112 of the female component 102, when receiving the imaging command from the controller 12.

Then, the vision sensor 62 calculates the coordinates of the center F of the top face 112 (FIG. 2) and the coordinates of one of the holes 110, from the image data. The vision sensor 62 transmits data of the calculated coordinates to the controller 12.

At step S2, the controller 12 grasps and lifts up the base part 104 of the male component 100 by the robot 14. Specifically, the controller 12 operates the robot 14 so as to arrange the fingers 32, 34 and 36 of the robot hand 22 at radially outward of the base part 104 of the male component 100 placed at a predetermined location H (FIG. 1).

Then, the controller 12 moves the fingers 32, 34 and 36 so as to approach each other to grasp the base part 104. Then, the controller 12 operates the robot 14 so as to lift up the base part 104.

By this operation, the shaft parts 106 are hooked on the base part 104 by the engagement between the flanges 106b and the top face 104a so as to be immovable to axially downward, thereby, the shaft parts 106 are suspended from the base part 104. In this state, a bottom face 46b (FIG. 6) of the receiving plate 46 of the movable receiving part 38 is somewhat separate upward from the flanges 106b of the male component 100.

At step S3, the controller 12 arranges the base part 104 of the male component 100 at upward of the top face 112 of the female component 102 placed at the location G. Specifically, the controller 12 determines a position and posture of the base part 104 to be arranged by the robot 14, based on the coordinate data acquired at step S1.

At this time, the controller 12 determines the position and posture of the base part 104, so that the male component 100 is positioned above the female component 102, that the base part 104 is positioned horizontally, that the coordinates in the horizontal plane of the center D (FIG. 4) of the base part 104 coincide with those of the center F (FIG. 2) of the top face 112 acquired at step S1, and that the coordinates in the horizontal plane of one of the through-holes 108 formed at the base part 104 coincide with those of the center of one of the holes 110 acquired at step S1.

Figure 6:
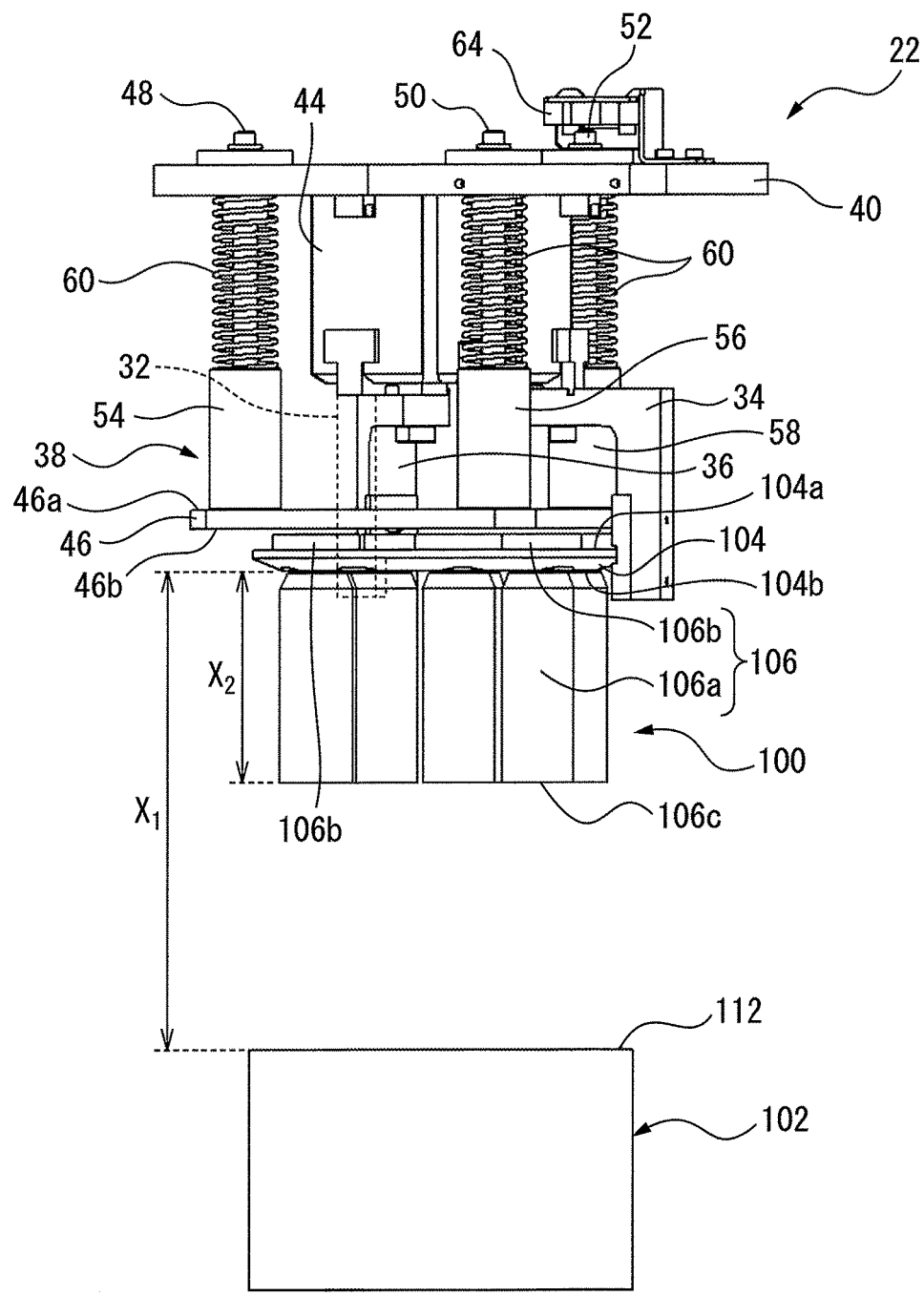
FIG. 6 is a view showing a positional relationship between the male component and the female component at the end of step S3 in FIG. 5.

The controller 12 operates the robot 14 so as to arrange the base part 104 at the determined position and posture. Due to this, the male component 100 is positioned upward of the female component 102 so that the through-holes 108 of the base part 104 are respectively positioned above the holes 110 of the female component 102. This state is shown in FIG. 6. Note that, in FIG. 6, a part of the finger 32 is represented by a dotted line, for the sake of easy understanding.

At step S4, the controller 12 moves the base part 104 grasped by the robot hand 22 downward from, the position at the end of step S3, so that a bottom face 104b of the base part 104 approaches the top face 112 of the female component 102. Specifically, the controller 12 operates the robot 14 so as to move the base part 104 downward by a predetermined distance so that a distance $X_1$ is smaller than a distance $X_2$ (i.e., $X_1 < X_2$).

The distance $X_1$ is a vertical distance between the bottom face 104b of the base part 104 and the top face 112 of the female component 102. On the other hand, the distance $X_2$ is a vertical distance between the bottom face 104b of the base part 104 and the tip ends 106c of the shaft parts 106 suspended from the base part 104.

As an example, the controller 12 calculates the distance $X_1$ when it determines the position and posture of the base part 104 at step S3, while the controller 12 previously records the distance $X_2$. The distance $X_2$ can be previously measured as a value obtained when the shaft parts 106 are suspended so that the axial direction B thereof is substantially parallel with the vertical direction.

As described above, since the tip ends 106c of the shaft parts 106 are free ends, the axial direction B of the shaft parts 106 suspended from the base part 104 may be inclined with respect to the vertical direction, when step S4 is executed.

Figure 7:
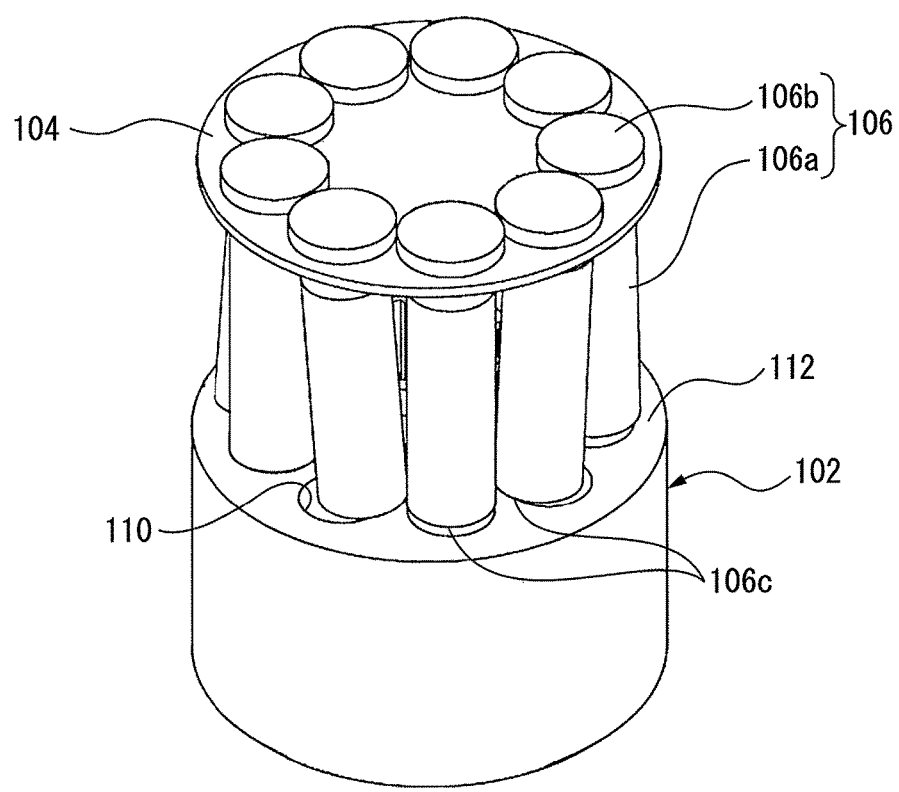
FIG. 7 is a view showing a state in which the tip ends of the shaft parts butt against the top face of the female component.

If the shaft parts 106 are thus inclined, the tip ends 106c of the inclined shaft parts 106 butt against the top face 112 of the female component 102 at the end of step S4. This state is shown in FIG. 7. In this state, the shaft parts 106 cannot be appropriately inserted into the corresponding holes 110.

In order to easily fit the shaft parts 106 into the corresponding holes 110, step S5 described below is carried out in this embodiment.

At step S5, the controller 12 horizontally reciprocates each of portions of the base part 104, from which the shaft parts 106 are suspended, and concurrently with which, the controller 12 moves the base part 104 downward. In this embodiment, the portions of the base part 104, from which the shaft parts 106 are suspended, correspond to the through-holes 108 formed at the base part 104.

At this step S5, the controller 12 sends to each servomotor 28 built in the robot 14 a reciprocation command for alternately rotating the base part 104 about the center D (FIG. 4) thereof in a normal rotation direction I and a reverse rotation direction J opposite to the normal rotation direction by a predetermined angle $\theta_1$ (e.g., 10°). The normal rotation direction I and the reverse rotation direction J are parallel with the horizontal direction.

The robot 14 alternately rotates the base part 104 in the normal rotation direction I and the reverse rotation direction J in accordance with this reciprocation command, and thereby, all of the through-holes 108 formed at the base part 104 are horizontally reciprocated in the normal rotation direction I and the reverse rotation direction J.

Figure 8:
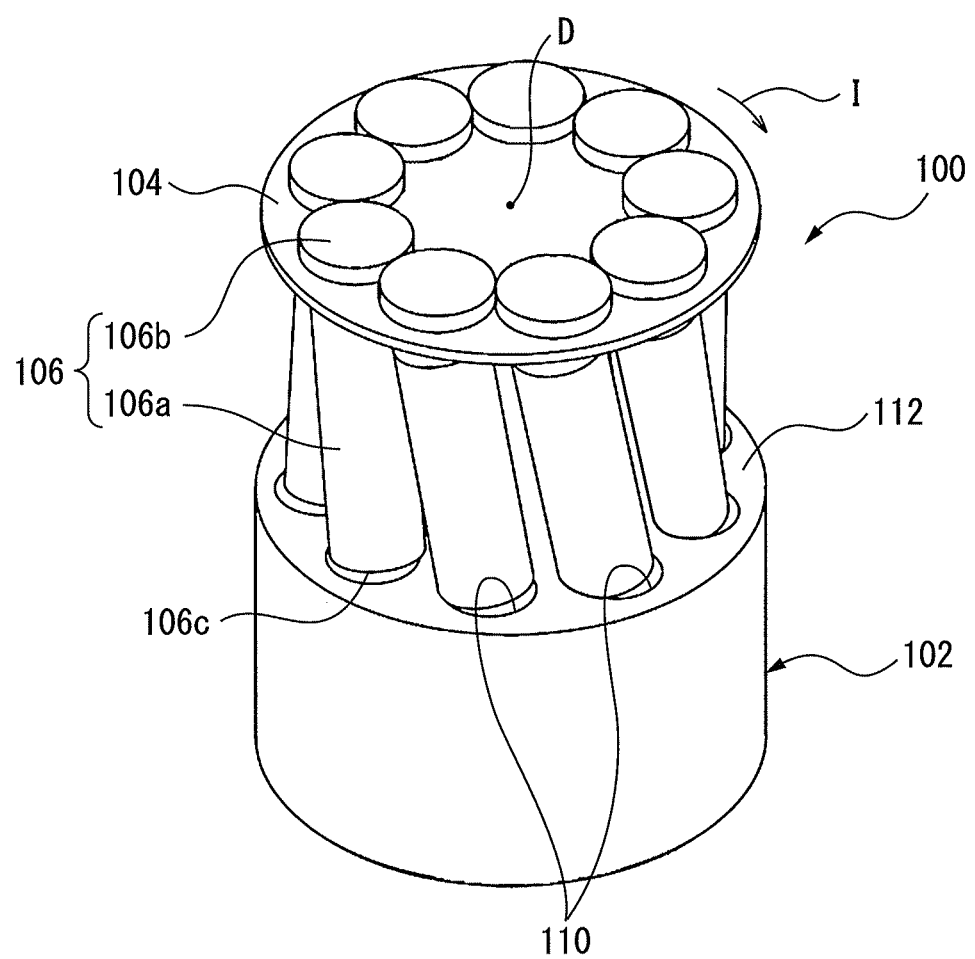
FIG. 8 is a view showing that the base part is rotated by the robot in a direction indicated by arrow I in FIG. 8 (i.e., determines "NO"rmal rotation direction)
Figure 9:
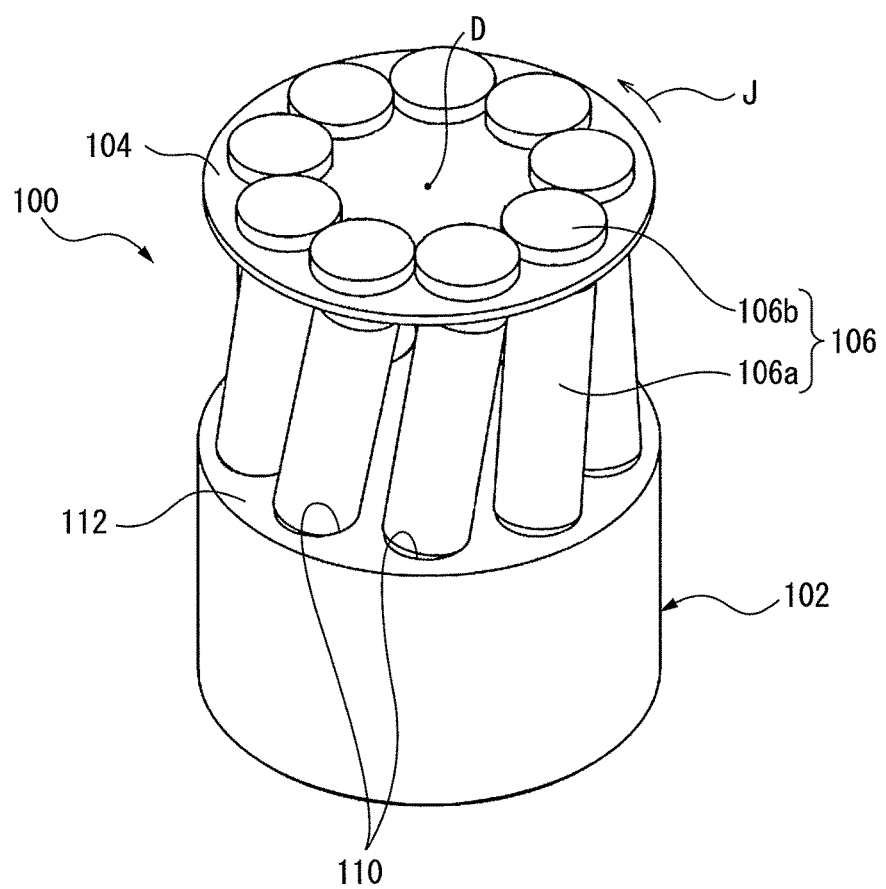
FIG. 9 is a view showing that the base part is rotated by the robot in a direction indicated by arrow J in FIG. 9 (i.e., reverse rotation direction)

FIG. 8 shows a state where the base part 104 is rotated by the robot 14 in the normal rotation direction I. On the other hand, FIG. 9 shows a state where the base part 104 is rotated by the robot 14 in the reverse rotation direction J.

The angle $\theta_1$ (i.e., the amount of movement of the base part 104 when reciprocating) is predetermined by a user as a value which enables the tip end 106c of each shaft part 106 suspended from the base part 104 to reciprocate on the top face 112 along a pathway which passes the corresponding hole 110.

In this embodiment, at the above-mentioned step S3, the base part 104 is arranged so that the coordinates in horizontal plane of the center D of the base part 104 coincide with those of the center F of the top face 112, and that the coordinates in horizontal plane of the center of one of the through-holes 108 coincide with those of the center of one of the holes 110.

Therefore, when the base part 104 is reciprocated, a projection domain obtained by projecting one through-hole 108 downward onto the top face 112 passes the region of the corresponding hole 110 positioned below the through-hole 108. Accordingly, the tip ends 106c of the main bodies 106a inserted in the through-holes 108 can reciprocate on the top face 112 so as to pass the corresponding holes 110.

Concurrently with the reciprocation command, the controller 12 sends to each servomotor 28 built in the robot 14 a downward movement command for downwardly moving the base part 104 by the robot 14 by a predetermined distance. In accordance with the downward movement command, the robot 14 downwardly moves the base part 104 by the predetermined distance, concurrently with reciprocating the base part 104.

In this way, the tip ends 106c of the shaft parts 106 are reciprocated on the top face 112 while the base part 104 are moved downward, thereby the tip ends 106c of the main bodies 106a can be easily fitted into the corresponding holes 110.

Figure 10:
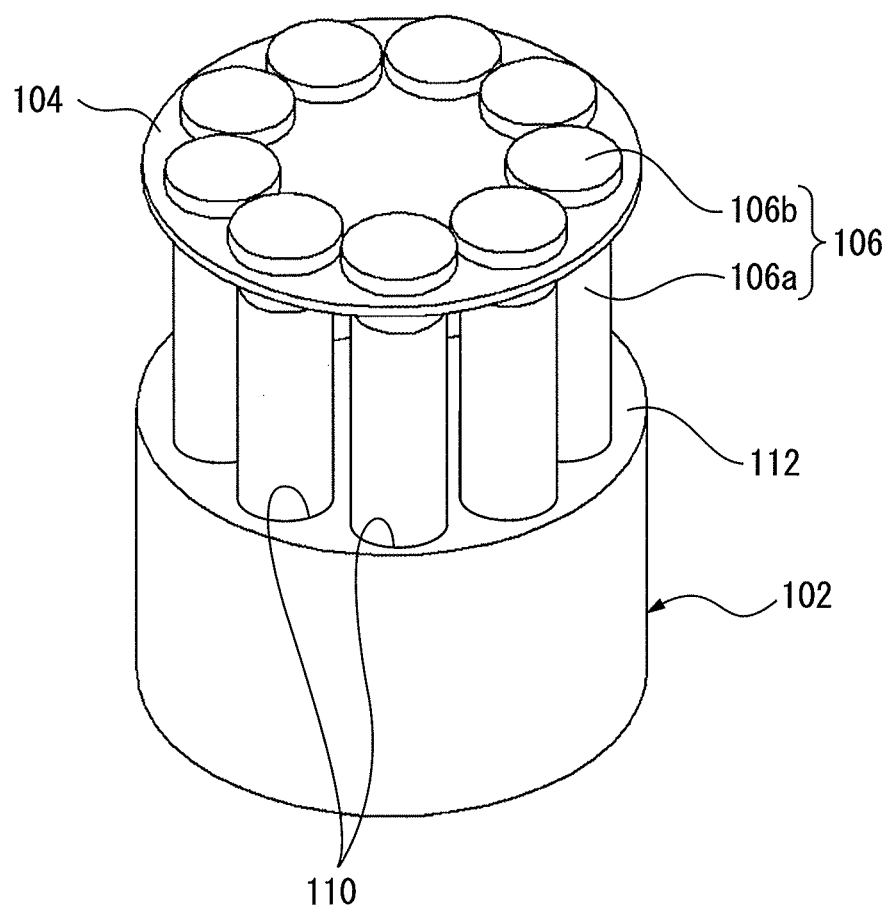
FIG. 10 is a perspective view showing a state in which the tip ends of all main bodies are appropriately fitted into the corresponding holes.
Figure 11:
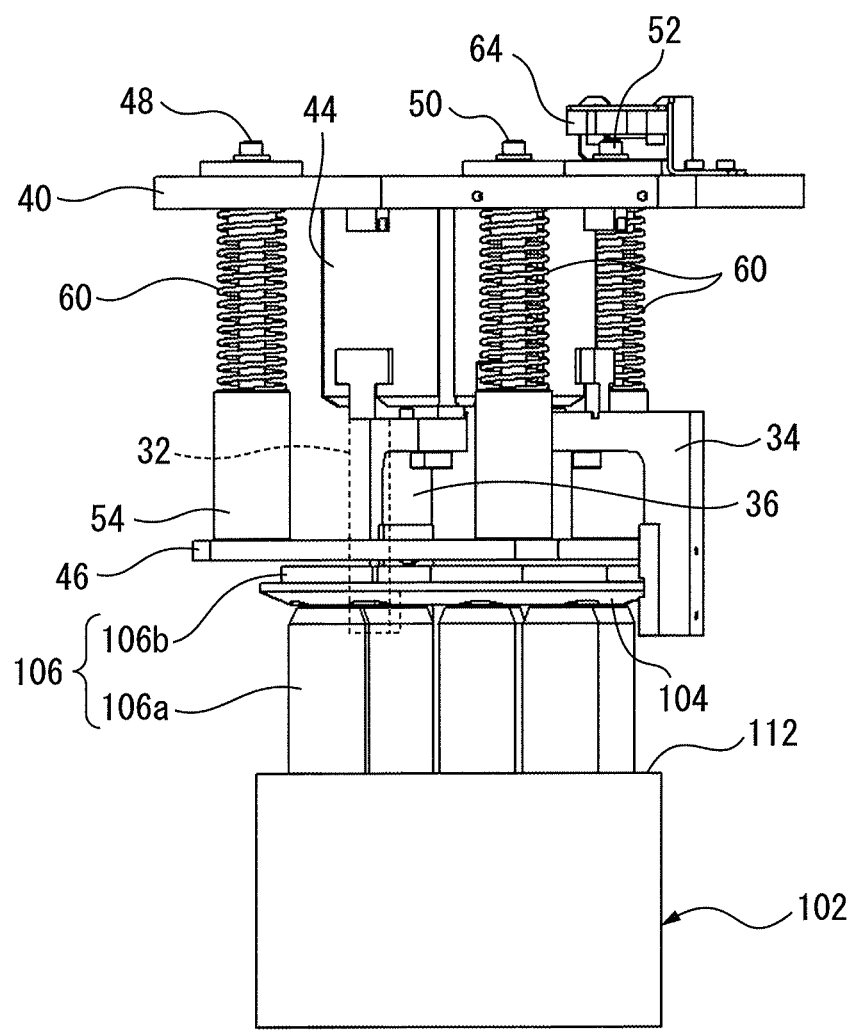
FIG. 11 is a side view showing a state in which the tip ends of all main bodies are appropriately fitted into the corresponding holes.

FIGS. 10 and 11 show a state where all of the tip ends 106c of the main bodies 106a are inserted into the corresponding holes 110. In this embodiment, by carrying out this step S5, it is possible to facilitate fitting the tip ends 106c of the main bodies 106a, which are free ends, into the corresponding holes 110.

At step S6, the controller 12 moves the base part 104 downward further from the position at the end of step S5. As an example, the controller 12 operates the robot 14 so as to downwardly move the base part 104 until the bottom face 104b of the base part 104a contacts the top face 112 of the female component 102 if all the main bodies 106a are fitted into the corresponding holes 110 at step S5.

Figure 12:
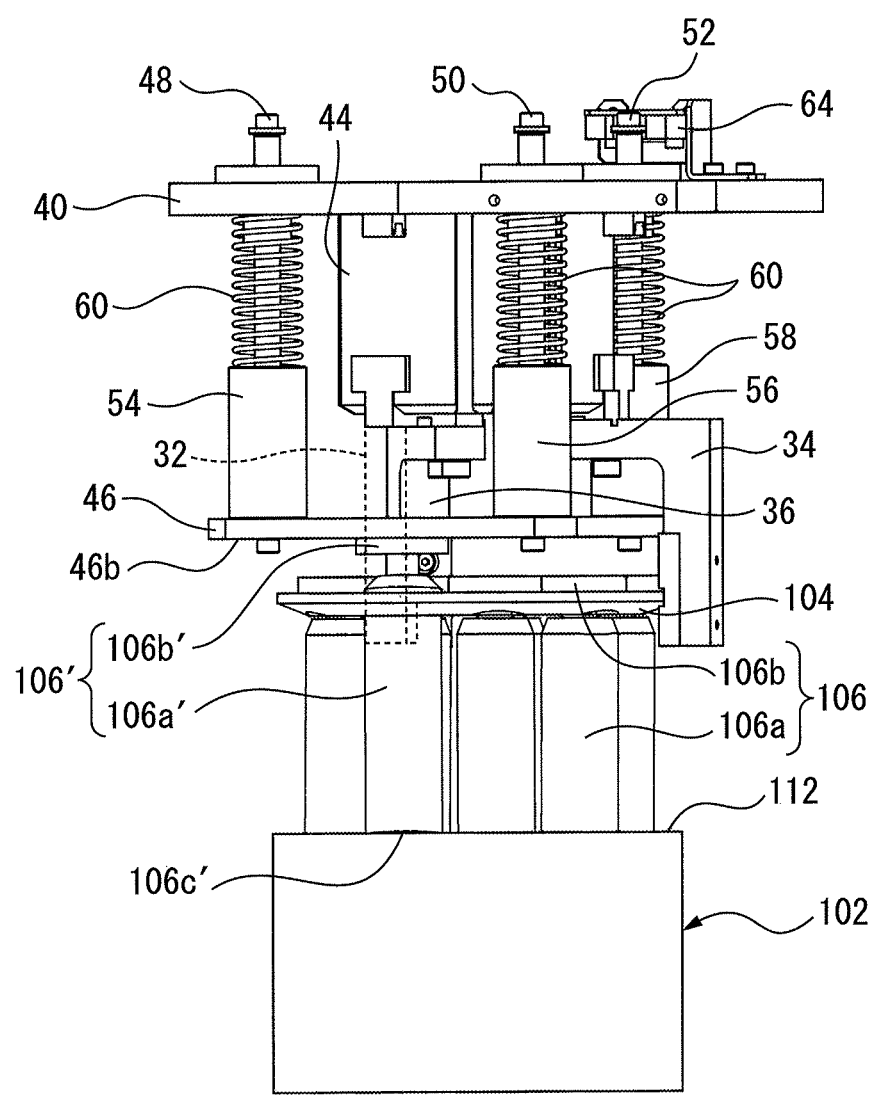
FIG. 12 is a side view showing a state in which the main body of the shaft part is not appropriately fitted into the hole, thereby the tip end of the main body butt against the top face of the female component.

At step S7, the controller 12 determines whether at least one shaft part 106 is displaced upward with respect to the base part 104. Assuming that, as a result of execution of step S5, a main body 106a' of one shaft part 106' is not fitted into the corresponding hole 110 so that a tip end 106c' of the main body 106a' butts against the top face 112, as shown in FIG. 12.

If the base part 104 is moved downward at step S6 in this state, the main body 106a' relatively slides in the through-hole 108 to which the main body 106a' is inserted, thereby, the shaft part 106' is displaced upward with respect to the base part 104. Consequently, a flange 106b' of the shaft part 106' butts against the bottom face 46b of the receiving plate 46.

As the base part 104 is further moved downward while the flange 106b' butts against the bottom face 46b of the receiving plate 46, the receiving plate 46 is relatively pushed by the flange 106b' toward the base plate 40. Consequently, the movable receiving part 38 is relatively displaced toward the base plate 40 against the biasing force of the coil springs 60, thereby the shafts 48, 50 and 52 are displaced upward relative to the base plate 40.

In this embodiment, the displacement detecting part 64 detects that the shaft part 106' is displaced upward relative to the base part 104, by detecting the displacement of the shaft 48, 50 or 52 described above. The displacement detecting part 64 transmits a displacement detecting signal to the controller 12 when it detects the displacement of the shaft 48, 50 or 52.

At this step S7, the controller 12 determines whether it receives the displacement detecting signal from the displacement detecting part 64. The controller 12 proceeds to step S9 when it determines that it receives the displacement detecting signal (i.e., determines "YES"). On the other hand, the controller 12 proceeds to step S8 when it determines that it does not receive the displacement detecting signal (i.e., determines "NO").

At step S8, the controller 12 determines whether it completes all of fitting operations included in the operation command received from a user, host controller or program. The controller 12 ends the process shown in FIG. 5 when it determines that all of the fitting operations have been completed (i.e., determines "YES").

On the other hand, the controller 12 returns to step S1 when it determines that there is at least one fitting operation to be done (i.e., determines "NO"). Then, the controller 12 carries out a next fitting operation for fitting the male component 100 into the female component 102.

On the other hand, when it is determined "YES" at step S7, at step S9, the controller 12 moves the base part 104 upward. Specifically, the controller 12 operates the robot 14 so as to upwardly move the base part 104 to the position at the end of step S3.

In this instance, the tip ends 106c of the shaft parts 106 move upward again so as to separate away from the top face 112 of the female component 102. Then the controller 12 returns to step S4, and repeats a loop of steps S4 to S9 until it determines "NO" at step S7.

As described above, in this embodiment, the controller 12 reciprocates the base part 104 along with moving it downward, at step S5.

Due to this configuration, if the tip ends 106c of some of the shaft parts 106 butts against the top face 112 of the female component 102 at step S4, the tip ends 106c of the shaft parts 106 can be reciprocated so as to pass the corresponding holes 110. Therefore, it is possible to facilitate fitting the main bodies 106a of the shaft parts 106 into the corresponding holes 110.

Further, in this embodiment, the controller 12 determines whether the shaft parts 106 (in particular, shafts 48, 50 and 52) are displaced at step S7, and carries out step S5 again when detecting the displacement of the shaft parts 106. According to this configuration, it is possible to reliably fit the main bodies 106a of the shaft parts 106 into the corresponding holes 110.

Further, in this embodiment, the displacement detecting part 64 detects the displacement of the shaft 48, 50, or 52. According to this configuration, it is possible to reliably detect that the main bodies 106a of some shaft parts 106 are not appropriately fitted into the corresponding holes 110, with a simpler configuration.

Further, in this embodiment, the controller 12 acquires from the vision sensor 62 the coordinates of the center F of the female component 102 and the coordinates of one hole 110 at step S1, and positions the base part 104 at step S3 based on the acquired coordinates.

According to this configuration, the main bodies 106 of the shaft parts 106 can be positioned just above the corresponding holes 110 at the end of step S3, and therefore, it is possible to easily fit the main bodies 106 into the corresponding holes 110 at step S5. In addition, since the amount of movement (angle $\theta_1$) in the reciprocation of the base part 104 at step S5 can be set to be a small value, step S5 can be more quickly carried out.

Further, by employing such vision sensor 62, it is possible to carry out the fitting operation if the male component 100 is not accurately positioned relative to the female component 102.

Note that, in the above embodiment, the male component 100 is fitted into the female component 102. However, a male component and a female component, which have other shapes, can be fitted with each other by the robot 14.

Figure 13:
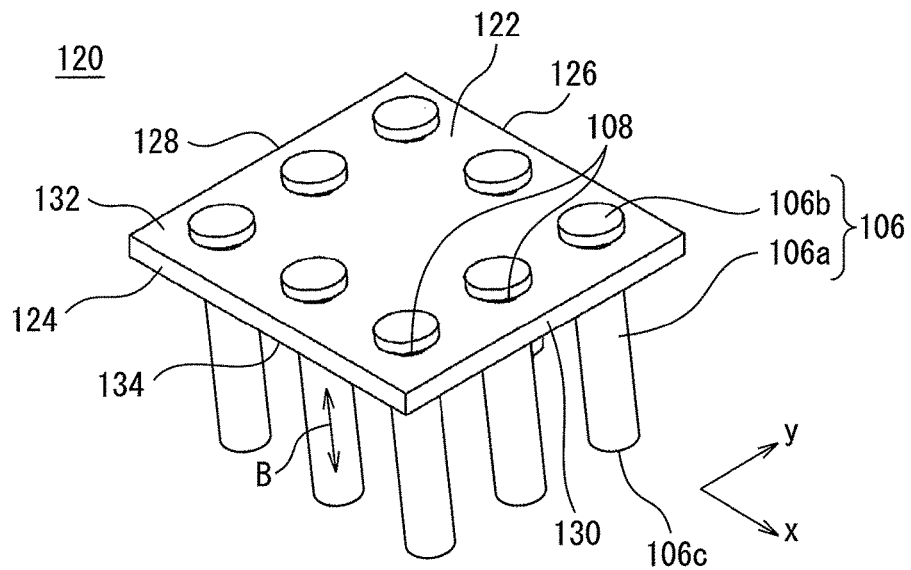
FIG. 13 is a view of a male component according to another embodiment.

FIG. 13 shows a male component 120 according to another embodiment. Note that, in this embodiment, elements similar to those of the above embodiment are assigned the same reference numerals, and the detailed description thereof will be omitted. The male component 120 includes a base part 122 and a total of eight shaft parts 106.

The base part 122 is a square plate member. Specifically, the base part 122 includes sides 124 and 126 extending in the x-axis direction in FIG. 13 so as to be opposite to each other in parallel with each other, sides 128 and 130 extending in the y-axis direction in FIG. 13 so as to be opposite to each other in parallel with each other, a top face 132, and a bottom face 134.

A total of eight through-holes 108 are formed at the base part 122. In this embodiment, three through-holes 108 are aligned adjacent to the side 124 in the x-axis direction, and three through-holes 108 are arranged in the x-axis direction so as to be adjacent to the side 126. Further, three through-holes 108 are arranged in the y-axis direction so as to be adjacent to the side 128, and three through-holes 108 are arranged in the y-axis direction so as to be adjacent to the side 130.

The shaft parts 106 are respectively received in the corresponding through-holes 108 so as to slide in the axial direction B of the shaft parts 106. The robot hand 22 grasps the base part 122 of the male component 120 by the fingers 32, 34, and 36, when grasping the male component 120 according to this embodiment.

Figure 14:
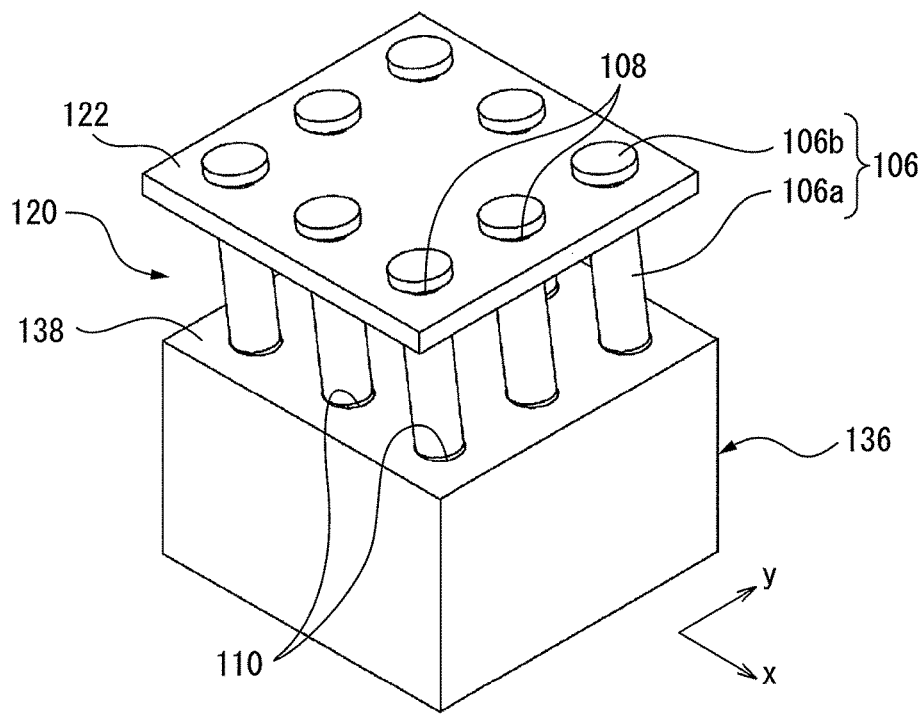
FIG. 14 is a view showing that the base part is reciprocated by a robot in the x-axis direction in FIG. 14.

The male component 120 is fitted to a female component 136 shown in FIG. 14. The female component 136 is a quadrangular prism-like member, and includes a top face 138 and a total of eight holes 110 formed to be recessed downward from the top face 138. These holes 110 are arranged at positions corresponding to the positions of the through-holes 108 formed at the base part 122.

Next, a method of fitting the male component 120 to the female component 136 by the robot 14 will be described with reference to FIG. 5. Note that, in the method according to this embodiment, regarding steps similar to those of the above-mentioned embodiment, the detailed description thereof will be omitted.

At step S1, the controller 12 images the top face 138 of the female component 136 by the vision sensor 62. The vision sensor 62 calculates from the image data the coordinates in horizontal plane (i.e., the x-y plane in FIG. 14) of the holes 110 formed at the female component 136. The vision sensor 62 transmits data of the calculated coordinates to the controller 12.

At step S3, the controller 12 arranges the base part 122 of the male component 120 at upward of the top face 138 of the female component 136 placed at the location G. Specifically, the controller 12 determines a position and posture of the base part 122 to be arranged by the robot 14, based on the data of the coordinates acquired at step S1.

At this time, the controller 12 determines the position and posture of the base part 122 so that the male component 120 is positioned above the female component 136, that the base part 122 is arranged horizontally, and that the coordinates in horizontal plane of the centers of the through-holes 108 formed at the base part 122 respectively coincide with those of the centers of the corresponding holes 110 acquired at step S1.

The controller 12 operates the robot 14 so as to arrange the base part 122 at the determined position and posture. As a result, the male component 120 is positioned upward of the female component 136 so that the through-holes 108 of the base part 122 are respectively positioned above the corresponding holes 110 of the female component 136.

At step S5, the controller 12 horizontally reciprocates each of portions of the base part 122, from which the shaft parts 106 are suspended, and concurrently with which, the controller 12 moves the base part 122 downward. The portions of the base part 122, from which the shaft parts 106 are suspended, correspond to the through-holes 108 formed at the base part 122.

At this step S5, the controller 12 sends to each servomotor 28 built in the robot 14 a reciprocation command for reciprocating the base part 122 in the x-axis direction and the y-axis direction in FIG. 14 respectively, by an amount of movement (e.g., 30 mm).

In accordance with the reciprocation command, the robot 14 reciprocates the base part 122 in the x-axis direction, and thereby, all of the through-holes 108 formed at the base part 122 is reciprocated in the x-axis direction. FIG. 14 shows a state where the base part 122 is reciprocated in the x-axis direction.

Figure 15:
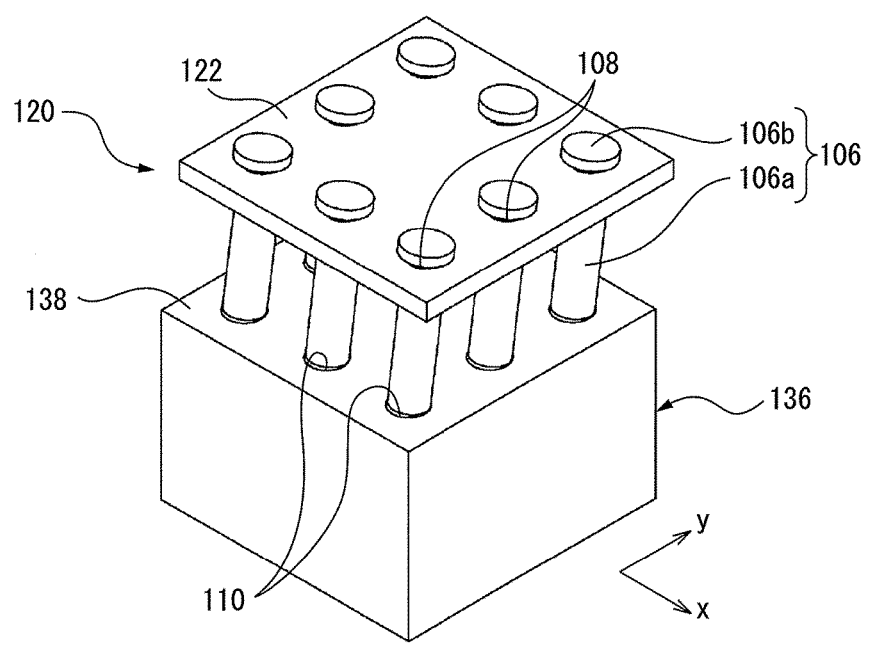
FIG. 15 is a view showing that the base part is reciprocated by a robot in the y-axis direction in FIG. 15.

Then, the robot 14 reciprocates the base part 122 in the y-axis direction, and thereby, all of the through-holes 108 formed at the base part 122 is reciprocated in the y-axis direction. FIG. 15 shows a state where the base part 122 is reciprocated in the y-axis direction.

The amount of movement is predetermined by a user as a value which enables the tip end 106c of each shaft part 106 suspended from the base part 122 to reciprocate on the top face 138 along a pathway which passes the corresponding hole 110.

Concurrently with the reciprocation command, the controller 12 sends to each servomotor 28 contained in the robot 14 a downward movement command for downwardly moving the robot 14 by the robot 14 by a predetermined distance. In accordance with the downward movement command, the robot 14 downwardly moves the base part 122 by the predetermined distance, concurrently with reciprocating the base part 122.

By carrying out this step S5, it is possible to facilitate fitting the tip ends 106c of the main bodies 106a, which are free ends, into the corresponding holes 110.

Figure 16:
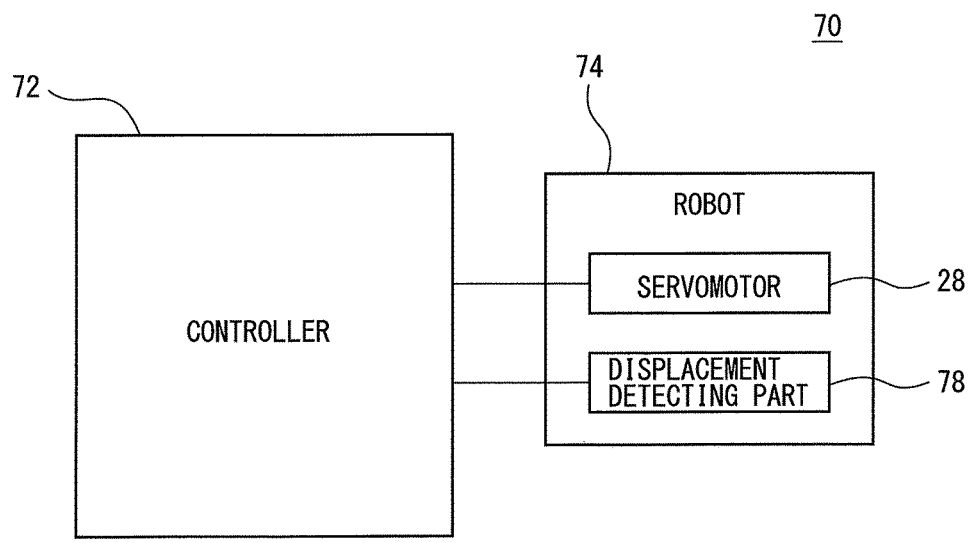
FIG. 16 is a block diagram of a robot system according to another embodiment.

Next, a robot system 70 according to another embodiment will be described with reference to FIGS. 16 and 17. The robot system 70 is for grasping and moving the male component 100 shown in FIG. 4 so as to fit it into the female component 102, similar to the above-mentioned robot system 10.

The robot system 70 includes a controller 72 and a robot 74. The controller. 72 includes e.g. a central processing unit (CPU) and a memory (both are not shown), and directly or indirectly control each component of the robot 74.

The robot 74 according to this embodiment is different from the above-mentioned robot 14 in the following features. In particular, the robot 74 includes a robot hand 76 and a displacement detecting part 78 shown in FIG. 17. The robot hand 76 can be connected to the wrist 26 shown in FIG. 1, instead of the robot hand 22.

Figure 17:
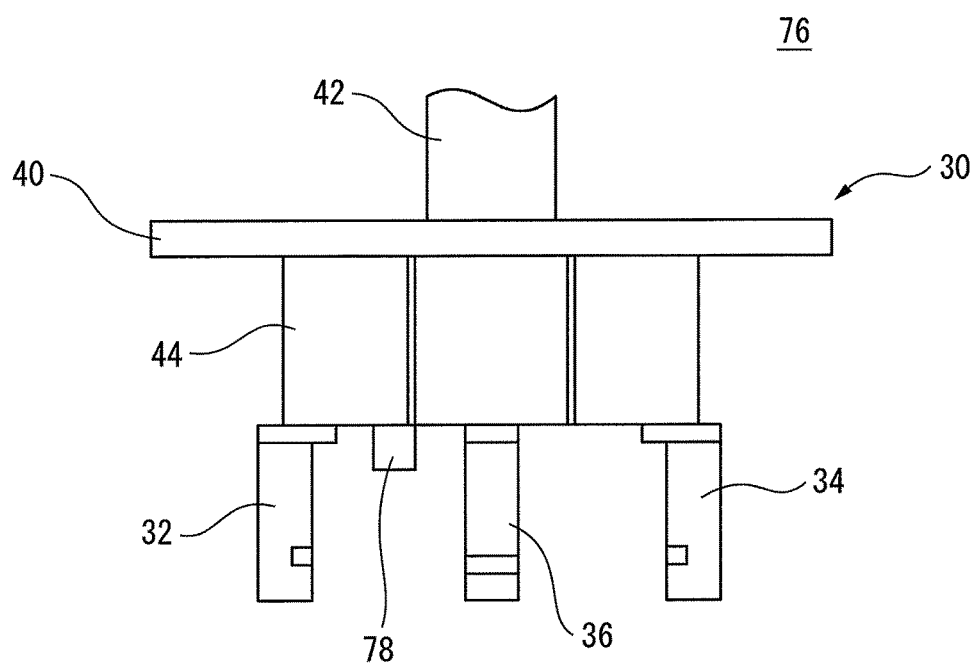
FIG. 17 is a view of a robot hand provided in the robot shown in FIG. 16.

As shown in FIG. 17, the robot hand 76 includes the hand base 30 and the plurality of fingers 32, 34 and 36, similar to the above-mentioned robot hand 22, but does not include the movable receiving part 38 provided in the robot hand 22.

The displacement detecting part 78 includes e.g. a proximity switch or a displacement gauge, and is attached to the finger retaining part 44 of the hand base 30. The displacement detecting part 78 according to this embodiment can detect that each shaft part 106 (e.g., flange 106b) is displaced upward with respect to the base part 104, when the robot hand 76 grasps the male component 100.

Figure 18:
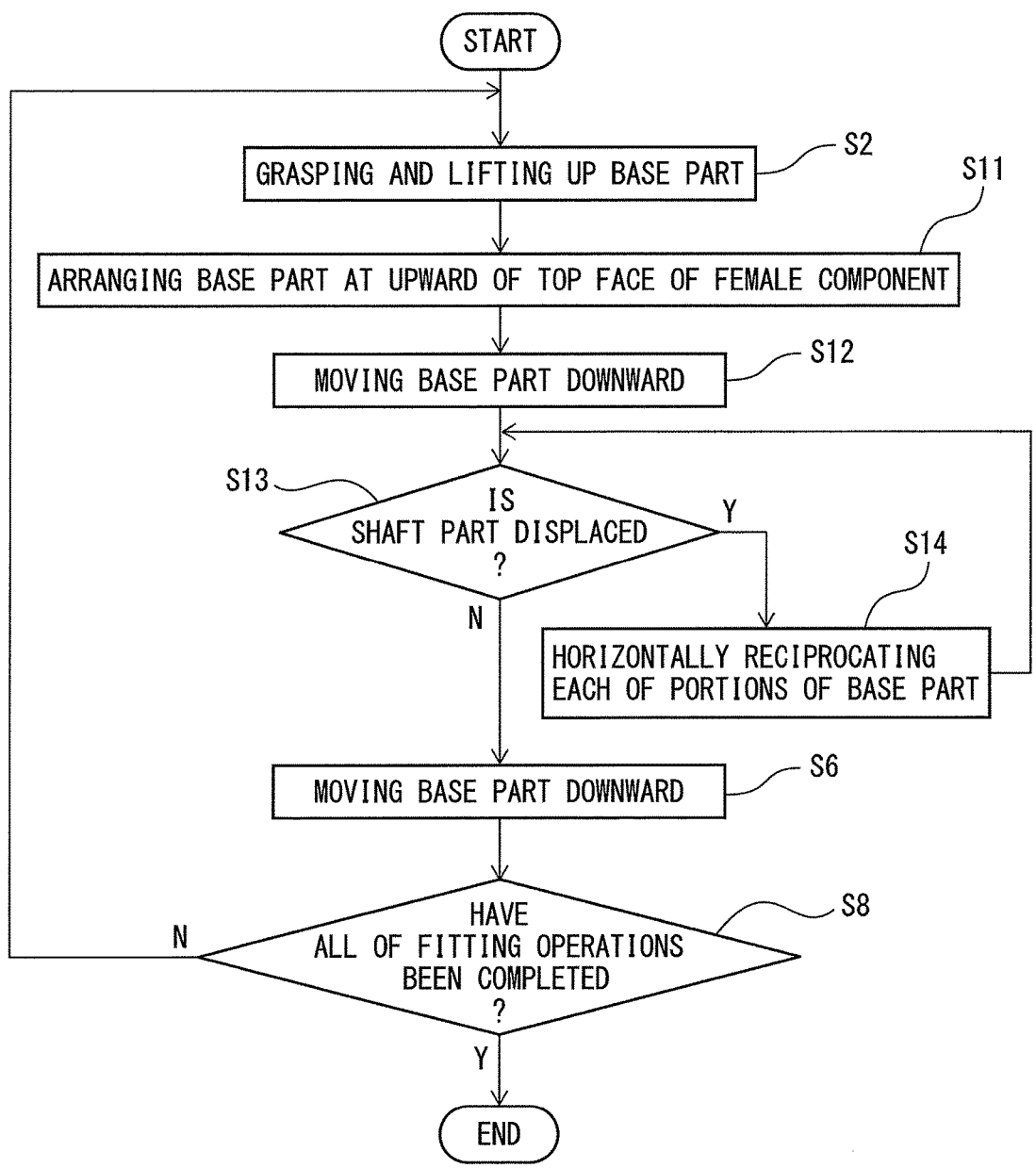
FIG. 18 is a flowchart of an example of a method of fitting a male component to a female component by the robot shown in FIG. 16.

Next, a method of fitting the male component 100 into the female component 102 by the robot 74 will be described with reference to FIG. 18. Note that, in the flow shown in FIG. 18, steps similar to those of the flow shown in FIG. 5 are assigned the same reference numerals, and the detailed descriptions thereof will be omitted.

After step S2, at step S11, the controller 72 arranges the base part 104 of the male component 100 at upward of the top face 112 of the female component 102 placed at the location G. Specifically, the controller 72 operates the robot 74 in accordance with a robot program so as to arrange the base part 104 of the male component 100 above the top face 112 of the female component 102.

At this time, the controller 72 arranges the base part 104 by the robot 74 so that the male component 100 is positioned above the female component 102, that the base part 104 is arranged horizontally, and that the center D (FIG. 4) of the base part 104 substantially coincides with the center F of the top face 112 (FIG. 2).

The robot program can be constructed by e.g. teaching the robot 74 the motion pathway thereof at step S11. The robot program is pre-stored in the memory built in the controller 72.

At step S12, the controller 72 moves the base part 104 grasped by the robot hand 76 downward from the position at the end of step S11. Specifically, the controller 72 downwardly moves the base part 104 by the robot 74 so that the distance $X_1$ is smaller than the distance $X_2$ (i.e., $X_1 < X_2$).

As described above, the distance $X_1$ is a vertical distance between the bottom face 104b of the base part 104 and the top face 112 of the female component 102. Further, the distance $X_2$ is a vertical distance between the bottom face 104b of the base part 104 and the tip ends 106c of the shaft parts 106 suspended from the base part 104.

In this embodiment, the controller 72 downwardly moves the base part 104 by the robot 74 until the distance $X_1$ reaches a distance obtained by subtracting a predetermined distance $X_3$ (e.g., 10 mm) from the distance $X_2$ (i.e., $X_1 = X_2 - X_3$).

Accordingly, if the axial direction B of at least one shaft part 106 is inclined so that the tip end 106c thereof butts against the top face 112 of the female component 102 at step S12, the at least one shaft part 106 is displaced upward with respect to the base part 104.

In this embodiment, the displacement detecting part 78 is arranged to detect the upward displacement of each shaft part 106 (flange 106b). The displacement detecting part 78 transmits a displacement detecting signal to the controller 72 when detecting that at least one shaft part 106 is displaced upward with respect to the base part 104.

At step S13, the controller 72 determines whether at least one shaft part 106 is displaced upward with respect to the base part 104. Specifically, the controller 72 transmits a command to the displacement detecting part 78 so as to detect the upward displacement of the shaft parts 106. The displacement detecting part 78 transmits the displacement detecting signal to the controller 72 when detecting the upward movement of at least one shaft part 106.

The controller 72 determines that at least one shaft part 106 is displaced upward (i.e., determines "YES") when receiving the displacement detecting signal from the displacement detecting part 78, and proceeds to step S14. On the other hand, the controller 72 determines that none of the shaft parts 106 are displaced upward (i.e., determines "NO") when not receiving the displacement detecting signal, and proceeds to step S6.

At step S14, the controller 72 reciprocates each of portions of the base part 104, from which the shaft parts 106 are suspended, in the horizontal direction. The portions of the base part 104, from which the shaft parts 106 are suspended, correspond to the through-holes 108 formed at the base part 104.

At this step S14, the controller 72 sends to each servomotor 28 built in the robot 74 a reciprocation command for alternately rotating the base part 104 in the normal rotation direction I and the reverse rotation direction J by a predetermined angle $\theta_2$.

In accordance with the reciprocation command, the robot 74 alternately rotates the base part 104 in the normal rotation direction I and the reverse rotation direction J, whereby all of the through-holes 108 formed at the base part 104 is horizontally reciprocated in the normal rotation direction I and the reverse rotation direction J.

The angle $\theta_2$ (i.e., the amount of movement of the base part 104 when reciprocating) is predetermined by a user as a value which enables the tip end 106c of each shaft part 106 suspended from the base part 104 can reciprocate on the top face 112 along a pathway which passes the corresponding hole 110.

Therefore, when the base part 104 is reciprocated in the normal rotation direction I and the reverse rotation direction J, a projection domain obtained by projecting one through-hole 108 onto the top face 112 in the vertical direction passes the region of the corresponding hole 110.

Thus, the tip ends 106c of the main bodies 106a inserted into the through-holes 108 are reciprocated on the top face 112 so as to pass the corresponding holes 110. The controller 72 returns to step S13 after carrying out step S14.

As described above, in this embodiment, when the controller 72 detects the displacement of at least one shaft part 106 at step S13, it reciprocates the base part 104 by the robot 74 at step S14.

According to this configuration, even if the tip ends 106c of some of the shaft parts 106 butt against the top face 112 of the female component 102 at step S12, it is possible to reliably fit the main bodies 106a of the shaft parts 106 into the corresponding holes 110.

Further, in this embodiment, the displacement detecting part 78 detects the displacement of the shaft parts 106. Due to this, it is possible to reliably detect that the main bodies 106a of some of the shaft parts 106 are not appropriately fitted into the corresponding holes 110, by a simpler configuration.

Note that, at step S9 in the flow shown in FIG. 5, the controller 12 may operate the robot 14 so as to move the base part 104 to the position at the end of step S4, and then, may return to step S5.

Further, in the above-mentioned embodiment, the displacement detecting part 64 is attached to the base plate 40. However, the displacement detecting part 64 may be arranged at any position as long as it can detect the upward displacement of the shaft parts 106 or the shafts 48, 50 and 52. Likewise, the displacement detecting part 78 can be arranged at any position as long as it can detect the upward displacement of the shafts 48, 50 and 52.

Further, a shape of a male component is not limited to that of the male component 100 or 120. A male component can have any shape if it includes a base part and a plurality of shaft parts suspended from the base part so as to be movable in an axial direction thereof. For example, a male component may include a net-like base part and shaft parts slidably hooked at holes formed in the net.

Further, in the above-mentioned embodiments, at steps S5 and S14, the controllers 12 and 72 horizontally reciprocates the portions of the base part 104, from which the shaft parts 106 are suspended.

However, the controllers 12 and 72 may horizontally move the portions of the base part 104 in only one direction. In this case, the controllers 12 and 72 moves the base part 104 so that the tip ends 106c of the shaft parts 106 suspended from the base part 104 pass the corresponding holes 110.

Further, above-mentioned steps S4 and S6 may be omitted from the flow shown in FIG. 5. As an example, at step S5 after step S3, the controller 12 reciprocates the base part 104 along with moving it downward.

Specifically, the controller 12 transmits the above-mentioned reciprocation command to each servomotor 28 built in the robot 14. Concurrently with this reciprocation command, the controller 12 transmits the downward movement command for downwardly moving the base part 104 by the robot 14 to each servomotor 28 built in the robot 14.

Then, the controller 12 executes step S7 after step S5. When the controller 12 determines "YES" at step S7, it stops the downward movement of the base part 104 performed by the robot 14, and proceeds to step S9.

On the other hand, when the controller 12 determines "NO" at step S7, it determines whether the bottom face 104b of the base part 104 butts against the top face 112 of the female component 102. For example, the controller 12 determines that the bottom face 104b of the base part 104 butts against the top face 112 of the female component 102, when a feedback value (load torque, feedback current, etc.) of the servomotors 28 exceeds a predetermined threshold value.

The controller 12 stops the downward movement of the base part 104 performed by the robot 14 when determining that the bottom face 104b of the base part 104 butts against the top face 112 of the female component 102, and proceeds to step S8. On the other hand, the controller 12 returns to step S7 when determining that the bottom face 104b of the base part 104 does not butt against the top face 112 of the female component 102.

Although the invention includes been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

Regarding the order of operations, including actions, sequences, steps, processes, and stages, in the devices, systems, programs, and methods indicated in the claims, specification and drawings, it should be noted that the terms "before", "prior to", etc., are not explicitly described, and any order can be realized unless the output of a previous operation is used in the subsequent operation. Regarding the processing in the claims, specification, and drawings, even when the order of operations is described using the terms "first", "next", "subsequently", "then", etc., for convenience, maintaining this order is not necessarily essential for working the inventions.

The invention claimed is:

1. A method of fitting a male component to a female component by a robot, the male component including:
   a base part; and
   a plurality of shaft parts attached to the base part, the plurality of shaft parts being movable in an axial direction thereof with respect to the base part and being hooked at predetermined positions so as to be not able to move in one direction of the axial direction, the female component including:
   a top face; and
   a plurality of holes formed to be recessed from the top face and arranged to be able to receive the plurality of shaft parts respectively, the method comprising:
   grasping the base part by the robot and arranging the base part at vertically upward of the top face of the female component so that the plurality of shaft parts are suspended at vertically downside from the base part in a state where the plurality of shaft parts are hooked at the predetermined positions so as to be not able to move in the axial direction toward vertically downward;
   moving the base part vertically downward by the robot so that a bottom face of the base part approaches the top face of the female component; and
   reciprocating all of portions of the base part, from which the shaft parts are suspended, in a first direction parallel to a horizontal direction and a second direction opposite the first direction, along with moving the base part vertically downward by the robot, so that a tip end of at least one shaft part slides on the top face of the female component along a pathway which passes the hole if the tip end of the at least one shaft part is not inserted into the hole so as to butt against the top face of the female component when moving the base part vertically downward by the robot.

2. The method according to claim 1, further comprising:
imaging the top face of the female component; and
determining a position and posture of the base part when arranging the base part at vertically upward of the top face, based on an image of the top face.

3. The method according to claim 1, wherein the base part includes a plurality of through-holes, wherein
the shaft part includes:
a main body inserted into the through-hole so as to be able to slide in the axial direction; and
a flange projecting out from the main body, and engaging the top face of the base part so as to hook the shaft part on the base part at the predetermined position.

4. A method of fitting a male component to a female component by a robot,
the male component including:
a base part; and
a plurality of shaft parts attached to the base part, the plurality of shaft parts being movable in an axial direction thereof with respect to the base part and being hooked at predetermined positions so as to be not able to move in one direction of the axial direction,
the female component including:
a top face; and
a plurality of holes formed to be recessed from the top face and arranged to be able to receive the plurality of shaft parts respectively,
the method comprising:
grasping the base part by the robot and arranging the base part at vertically upward of the top face of the female component so that the plurality of shaft parts are suspended at vertically downside from the base part in a state where the plurality of shaft parts are hooked at the predetermined positions so as to be not able to move in the axial direction toward vertically downward;
moving the base part vertically downward by the robot so that a bottom face of the base part approaches the top face of the female component; and
moving each of portion of the base part, from which the shaft parts are suspended, in a horizontal direction, so that a tip end of at least one shaft part slides on the top face of the female component along a pathway which passes the hole if the tip end of the at least one shaft part is not inserted into the hole so as to butt against the top face of the female component when moving the base part vertically downward by the robot; and
detecting that the at least one shaft part is displaced vertically upward with respect to the base part when moving the base part vertically downward.

5. The method according to claim 4, further comprising:
moving the base part vertically upward by the robot so that the tip ends of the plurality of shaft parts are separated vertically upward from the top face of the female component, when detecting that the at least one shaft part is displaced vertically upward;
moving the base part vertically downward by the robot so that the bottom face of the base part approaches the top face of the female component, after moving the base part vertically upward; and
moving each of the portions in the horizontal direction so that a tip end of at least one shaft part slides on the top face of the female component along a pathway which passes the hole if the tip end of the at least one shaft part is not inserted into the hole so as to butt against the top face of the female component, when the base part is moved vertically downward by the robot after moving the base part vertically upward.

* * * * *